United States Patent Office 2,934,562
Patented Apr. 26, 1960

2,934,562
PRODUCTION OF CONCENTRATED ACRYLIC ACID

Gerhard Faerber, Moers, and Fritz Kälber, Rheinberg, Germany, assignors to Deutsche Solvay-Werke G.m.b.H., Solingen-Ohligs, Germany No Drawing. Application May 18, 1955
Serial No. 509,425

Claims priority, application Germany September 20, 1954

3 Claims. (Cl. 260—533)

This invention relates to a process for the production of concentrated acrylic acid from acetylene, nickel carbonyl, carbon monoxide and excess water in presence of an acid and a solvent.

The production of acrylic acid from acetylene, carbon monoxide and water without application of pressure is known per se. Thus it has been proposed to produce aqueous acrylic acid from water, acetylene and nickel carbonyl in presence of an acid and a solvent. In the known process the operation is carried out in dilute aqueous solution, during which an approximately tenfold excess of water is used. The nickel chloride which is formed as a by-product during the reaction remains dissolved in the reaction mixture up to the working up. After the reaction is finished the mixture of nickel salt, water, solvent and acrylic acid is separated by distillation. The acrylic acid in this case collects as a dilute aqueous solution, since it forms an azeotropic mixture with water. On account of the great solubility of acrylic acid in water and is ready polymerisability, the production of concentrated acrylic acid from the aqueous acrylic acid collected according to the known process introduces great difficulties.

It has already been proposed to use extracting solvents such as ether or dichlorethylene for the removal of water from acrylic acid; anhydrous acrylic acid is not obtained in this way either, however. Solutions of extracting solvents, acrylic acid and water cannot be completely dried with the drying agents generally used such as, for example, calcium chloride or sodium sulphate. A 95% acrylic acid can be obtained if acrylic acid is extracted from its aqueous solution with a mixture of benzene and ethyl acetate and the solvent is removed by distillation. According to another known process, aqueous solutions of acrylic acid are treated with concentrated sulphuric acid and ammonium sulphate, whereby an 84–93% acrylic acid results with a yield of 82%.

For the production of concentrated acrylic acid from acetylene, water, a solvent, nickel carbonyl and carbon monoxide, in certain cases in presence of an acid, it was proposed to use water in such amounts only that practically all the water is used up for the conversion to the acrylic acid and for the production of hydrates. This process has the disadvantage, however, that the nickel salts separate out in solid form and must be filtered in each case. This again necessitates a special filtering arrangement. During the filtration there occur considerable losses of acrylic acid in the filter cake. In addition, the precipitated salts hinder the smooth course of the reaction.

The problem which is to be solved by the present invention is the production of concentrated acrylic acid practically in one operation from acetylene, nickel carbonyl, carbon monoxide and excess water in presence of an acid and a solvent. The invention is based upon the discovery that, for the solution of this problem, the choice of the solvent and the measurement of the quantities of solvent and water respectively which are to be used are critical.

It has been found that, for the solution of this problem, the solvents which are concerned are those which are at least partly soluble in water and form with water an azeotropic mixture, which has a boiling point below 140° C. and which is immiscible with a concentrated aqueous solution of nickel salt, so that in the reaction mixture a layer of a solution of acrylic acid is formed upon a concentrated solution of nickel salt. The amounts of solvent and water are to be so adjusted to one another that a part of the water takes up the nickel salt out of the reaction mixture with formation of a highly concentrated solution of nickel salt, which can be removed from the reaction mixture, if necessary continuously, and the remainder of the water forms with the solvent the azeotropic mixture which is distilled off. After removal of the azeotropic mixture, anhydrous acrylic acid with a content of over 96% is distilled off. The azeotropic mixture can be used for new charges again and again in continual circulation. For the process of the invention, which always proceeds in solution without solid substances, an acid has to be chosen which is stronger than acrylic acid in order that no nickel acrylate is formed.

As solvents for the purposes of the invention, preferably ketones, and of these again butanone-2 (methyl ethyl ketone) $CH_3$—$CH_2$—$CO$—$CH_3$, and also acetonitrile, are particularly suitable. It has been found that acrylic acid prepared in a ketone solution is more stable than the acid prepared, for example, in dioxan or tetrahydrofuran solution.

Some azeotropic mixtures of solvent and water together with their boiling point and content of water are given below:

| Solvent | Pressure, mm. Hg | Boiling point of the azeotropic mixture, ° C. | Water content, percent |
|---|---|---|---|
| Butanone-2 $CH_3$-$CH_2$-$CO$-$CH_3$ | 760<br>350 | 73.1<br>51.5 | 11.15<br>8.3 |
| Pentanone-3 $CH_3$-$CH_2$-$CO$-$CH_2$-$CH_3$ | 760 | 82.9 | 14 |
| Pentanone-2 $CH_3$-$CO$-$CH_2$-$CH_2$-$CH_3$ | 760 | 83.3 | 19.5 |
| 3-Methyl-butanone-2 $CH_3$-$CH$-$CO$-$CH_3$<br>$\quad\quad\quad\;\;$ $CH_3$ | 760 | 79 | 13 |
| Acetonitrile $CH_3CN$ | 760 | 77 | 18.36 |

If the process according to the invention is carried out with the aid of butanone-2 in the presence of hydrochloric acid, then an approximately threefold excess of water over that required for the formation of the acrylic acid is used. From this, in the course of the reaction, two parts of water form with the constantly newly-formed nickel salt a second layer underneath the solution of butanone-2 and acrylic acid. This salt solution, about 35–50% in concentration and free from acrylic acid, is continuously removed from the reaction mixture. The butanone-acrylic acid solution then still contains one part of water, which in each case must be so measured that it is within the azeotropic mixture of butanone with water, that is, the concentration of water must not be above 11.15% at atmospheric pressure. The working up takes place by fractionation, during which butanone and water first of all distil over and finally practically anhydrous acrylic acid with a content of over 96%. The azeotropic mixture of butanone and water may be used unchanged for the next charge.

*Example 1*

A solution of 1093 g. of methyl ethyl ketone, 107 g. of water, 4.4 g. of acrylic acid and 1.2 g. of hydroquinone was warmed to 30° C. in a reaction vessel, which was provided with a stirrer, thermometer, reflux condenser and gas inlet tube, and 20 cc. of nickel carbonyl were added. It was then heated further to 48° C. with stirring and a 19.4% aqueous solution of hydrochloric acid, further nickel carbonyl and acetylene slowly added. After the beginning of the reaction, recognizable by the change of colour from green to brown and by the increase of temperature, carbon monoxide was added in such amount that the proportion of carbon monoxide from nickel carbonyl to carbon monoxide gas was 63:37. Waste gas was evolved only in small quantity. The reaction temperature was maintained at 50° C. by cooling. After 100 minutes the experiment was completed.

There had been taken up:

164.7 litres of acetylene.
52.8 litres of carbon monoxide.
170.7 g. of nickel carbonyl.
74 g. of hydrogen chloride.

altogether 414.5 g. of water had been added. The reaction mixture was clear and consisted of two layers. The lower layer had been formed after the start of the reaction and had become larger in the further course of the experiment. It amounted to 334 g. and besides 204 g. of water it contained all the nickel chloride formed as well as traces of acrylic acid. The upper layer contained the acrylic acid produced, methyl ethyl ketone and 109 g. of water. This layer was fractionated by way of a Vigreux column 70 cm. in height, during which a bath temperature of 125° C. was not exceeded. Since at atmospheric pressure the aqueous azeotropic mixture with methyl ethyl ketone is more highly concentrated in respect to water, it was distilled at the beginning without vacuum. After about half of the contents of the flask had passed over, it was further distilled at a vacuum of about 300 mm. until the temperature rose. Over 90% of the amount of water which had been present in the upper reaction layer was found again in the methyl ethyl ketone which distilled over, besides only small amounts of acrylic acid. Finally, the contents of the flask were further distilled under the vacuum of the water-jet pump. After a small intermediate fraction, 345 g. of acrylic acid were obtained, which solidified in the ice-cooled receiver, and which had a melting point of 11° C. and according to the acid number was of 96.5% purity. The total yield amounted to 97.1%—referred to the total carbon monoxide—of which 95% had been obtained in the form of concentrated acrylic acid.

*Example 2*

The aqueous azeotropic methyl ethyl ketone solution from a previous experiment was used again in the form in which it was obtained during the production of concentrated acrylic acid. This consisted of 982 g. of methyl ethyl ketone solution containing 8.4% of water and 0.4% of acrylic acid. 200 g. of fresh methyl ethyl ketone which contained 0.57% of water, and 3 g. of hydroquinone were added. The solution was warmed to 38° C. in a reaction vessel which corresponded to that described in Experiment 1, and acetylene, nickel carbonyl and hydrochloric acid in the form of an aqueous 18.2% solution were added. After 10 minutes the reaction started, being recognizable by the change of colour of the solution as well as by the increase of tempertaure and the decline in the stream of waste gas. Carbon monoxide was added in the proportion of 40 to 60 with respect to the carbon monoxide from the nickel carbonyl. A greenish solution was formed in a second layer below the brown reaction solution. The plane of separation was clearly to be seen. After 120 minutes the reaction was completed, being recognizable in the increase of the stream of waste gas. Altogether 415.8 g. of water had been introduced. This amount was distributed as follows: 191 g. of water were present in the lower layer as solvent water, 116 g. of water were in the methyl ethyl ketone layer and the remainder had been used up for the production of acrylic acid. Altogether 178.1 litres of acetylene, 59.5 litres of carbon monoxide, 170.7 g. of nicked carbonyl and 74 g. of hydrogen chloride had been taken up. The lower aqueous layer contained only 1.5 acrylic acid. The upper layer was fractionated by way of a Vigreux column as indicated in Example 1. 405 g. of acrylic acid were produced altogether, that is 84.3% referred to the total carbon monoxide. Of this 365 g. were obtained in the form of 98% acrylic acid. That is, 76%, referred to the carbon monoxide introduced.

*Example 3*

A vertical reaction tube with a drain cock at the bottom was used. It was provided with reflux condenser, thermometer, stirrer and gas inlet tube. 1098 g. of methyl ethyl ketone, 142.3 g. of water and 5 g. of hydroquinone were first put in and, after warming to 40° C., there were slowly added aqueous 17.15% hydrochloric acid, acetylene, nickel carbonyl and, after the reaction had started, carbon monoxide. The temperature was maintained at 50° C. Immediately after the start of the reaction a second lower layer was formed. It was constantly removed through the drain cock in amount equal to the increase of volume, while the plane of separation was always kept at the same height. The total quantity of water first introduced and added with the aqueous hydrochloric acid amounted to 500.3 g. After 150 minutes 193 litres of acetylene, 70.5 litres of carbon monoxide, 170.7 g. of nickel carbonyl and 74 g. of hydrogen chloride had been taken up. The quantity of 500.3 g. of water was distributed as follows: 249 g. were contained in the drained-off nickel chloride solution, 128.5 g. of water had been used up for the production of acrylic acid, and the remaining 122.8 g. was in the solvent, which therefore had a water content of 11.25%. The layer containing acrylic acid was fractionated in a Vigreux column as described in Example 1. At a bath temperature of up to 130° C., it was distilled under atmospheric pressure until nothing more passed over. The rest of the methyl ethyl ketone was distilled over at 300 mm. of mercury. The acrylic acid remaining was distilled over at the full vacuum of the water-jet pump. Before concentrated acrylic acid passed over, an intermediate fraction was obtained which consisted of the aqueous azeotrope of the acrylic acid. 382 g. of acrylic acid were obtained altogether, which represents 74.5% of the theoretical quantity referred to carbon monoxide. Of this, 312 g. consisted of concentrated acrylic acid with a content of 96.5%.

What we claim is:

1. A process for the production of concentrated acrylic acid, comprising reacting, in the presence of an excess of water and of butanone-2, acetylene, nickel carbonyl, carbon monoxide, and hydrochloric acid, the water being used in a quantity approximately three to four times that required for the formation of the acrylic acid, the butanone-2 being used in a ratio of about 2 parts per part of water, causing a portion of the water to dissolve out of the reaction mixture the nickel salt as it forms and to settle in form of a layer of said nickel salt solution in highly concentrated form, causing the remainder of the water to form with butanone-2 an azeotropic mixture in form of a layer above the first named layer, and distilling over the azeotropic mixture.

2. A process as claimed in claim 1, in which the mixture of solvent and water collected during the distillation is recycled.

3. A process as claimed in claim 1, in which the solution of nickel salt is continuously withdrawn from the reaction mixture.

References Cited in the file of this patent

UNITED STATES PATENTS 2,613,222    Specht et al. _____ Oct. 7, 1952